June 25, 1968  R. R. STOCK  3,389,510
SHELTER

Filed April 6, 1966  2 Sheets-Sheet 1

INVENTOR.
RICHARD R. STOCK
BY John R. Walker, III
Attorney

June 25, 1968  R. R. STOCK  3,389,510
SHELTER

Filed April 6, 1966  2 Sheets-Sheet 2

INVENTOR.
RICHARD R. STOCK
BY *John R. Walker, III*
*Attorney*

United States Patent Office 3,389,510
Patented June 25, 1968

3,389,510
SHELTER
Richard R. Stock, 765 Rozelle, Memphis, Tenn. 38104
Filed Apr. 6, 1966, Ser. No. 540,662
7 Claims. (Cl. 52—2)

ABSTRACT OF THE DISCLOSURE

A lightweight shelter that includes a transparent enclosure that is particularly adapted for use in growing crops, with swimming pools, to enclose playgrounds for children, and for other uses where it is desirable to let sunlight into the interior of the shelter. The enclosure is of composite construction, which includes inner and outer sheets of plastic with ribs between the sheets which are formed from sleeves of plastic stuffed with pieces of expanded plastic. A netting of plastic is preferably provided on top of the ribs. A blower provides air to the interior of the shelter to force the inner sheet against the rib means, and the space between the inner and outer sheets is communicated with the outside atmosphere whereby the outer sheet is deflated to allow the outer sheet to be supported by the netting and/or the rib means.

---

This invention relates to lightweight shelters of the type in which portions thereof are partially supported by air under pressure in the interior of the shelter.

One of the objects of the present invention is to provide such a shelter that includes a uniquely constructed transparent enclosure that is particularly adapted for use in growing crops, with swimming pools, to enclose playgrounds for children, and other uses where it is desirable to let sunlight into the interior of the shelter.

A further object is to provide such an enclosure that is of the type of construction that includes in general a plurality of spaced apart rib means, an inner sheet subjacent the rib means, and an outer sheet above the rib means.

A further object is to provide such an enclosure which because of the unique composition thereof can utilize very thin sheets of plastic for the inner and outer sheets, and yet which is extremely strong.

A further object is to provide such an enclosure in which the rib means are uniquely constructed and somewhat rigid yet are flexible to a certain extent.

A further object is to provide such rib means which comprises sleeves of plastic that are stuffed with pieces of expanded plastic.

A further object is to provide such an enclosure which is economical to build, and yet is strong.

A further object is to provide such an enclosure which can be simply and easily erected.

A further object is to provide such an enclosure which is particularly useful in the growing of crops and which makes plastic greenhouses economical for the first time in latitudes where heat is a factor due to the labor-saving and cost-saving aspects of the present invention.

A further object is to provide such an enclosure which can be put on from the outside without having to disturb the growing crops on the inside, whereby a savings can be effected on the electrical bill over previous greenhouse practices.

A further object is generally to improve the design and construction of shelters.

The means by which the foregoing and other objects of the present invention are accomplished and the manner of their accomplishment will be readily understood from the following specification upon reference to the accompanying drawings, in which.

Figure 1:
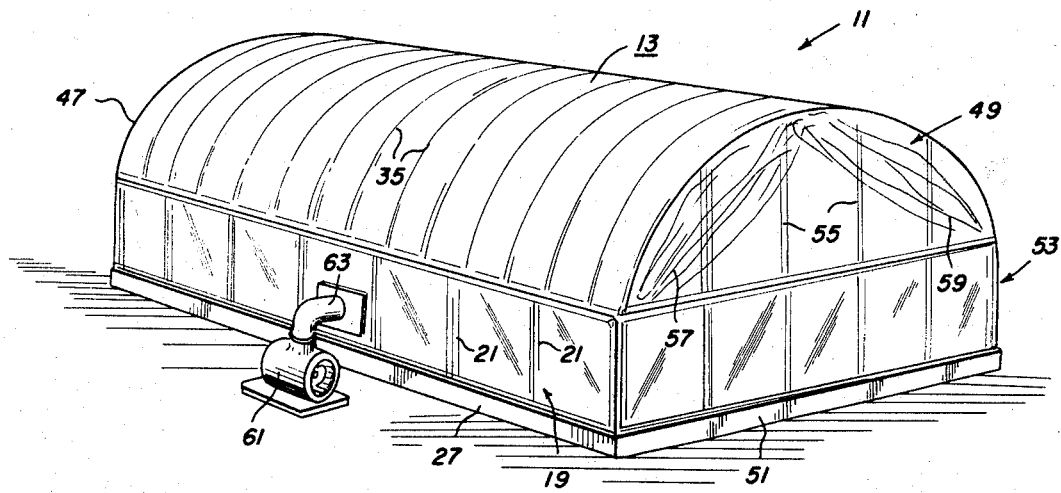
FIG. 1 is a perspective view of a shelter in which the concept of the present invention is employed therewith.
Figure 2:
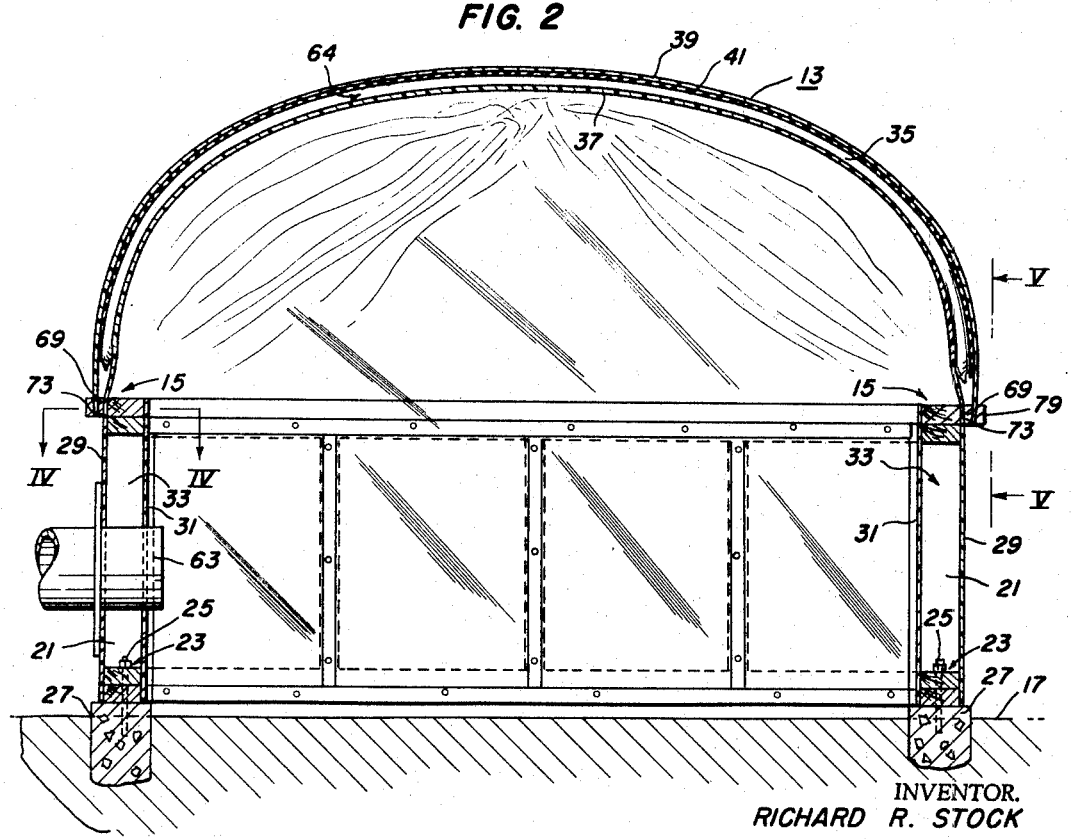
FIG. 2 is a transverse sectional view of the shelter of FIG. 1.
Figure 3:
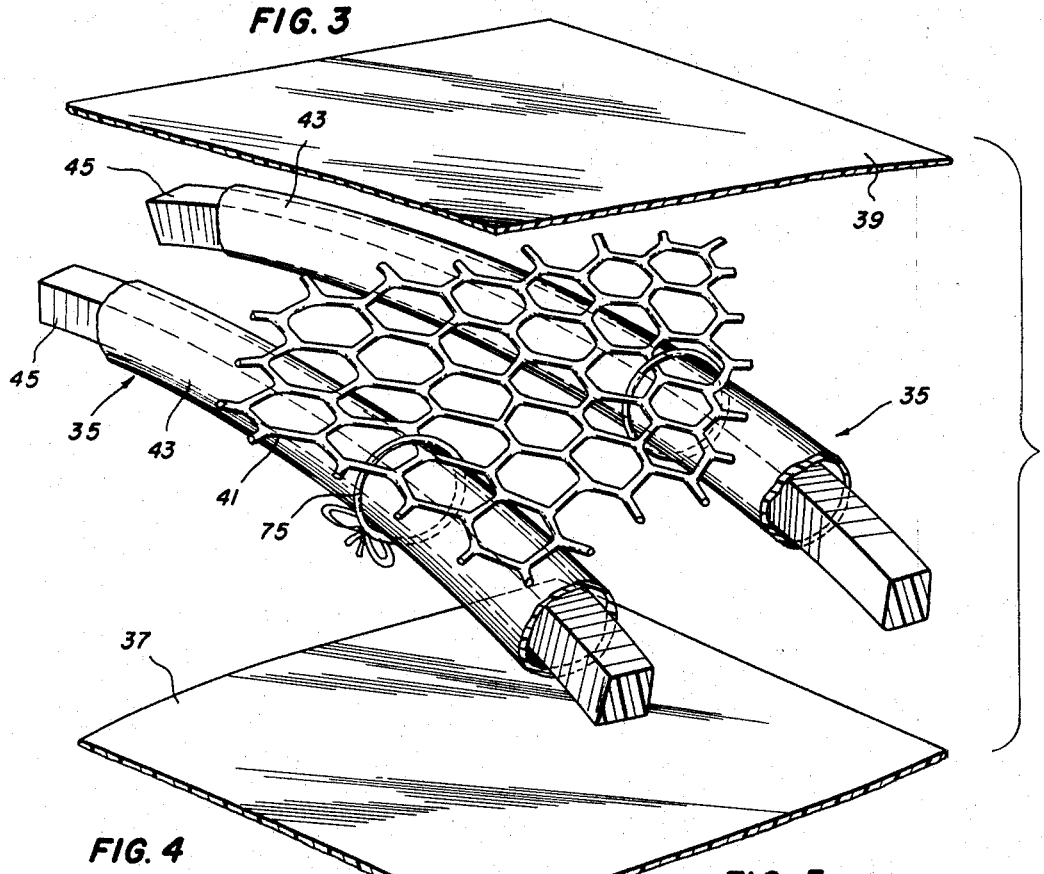
FIG. 3 is an exploded view of a portion of the unique transparent enclosure of the present invention.
Figure 4:
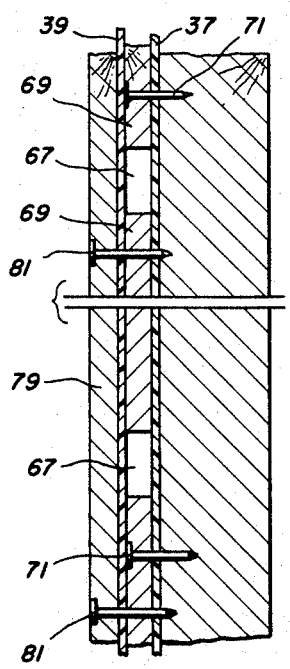
FIG. 4 is a fragmentary sectional view taken as on the line IV—IV of FIG. 2.
Figure 5:
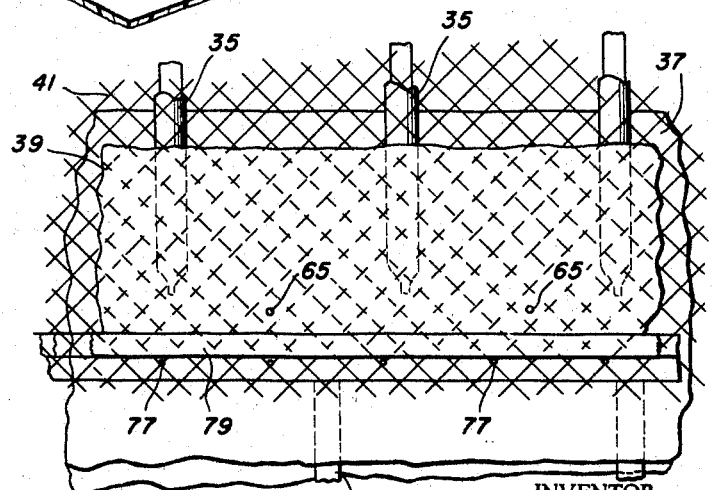
FIG. 5 is a somewhat schematic fragmentary elevational view taken as on the line V—V of FIG. 2.

Referring now to the drawings, in which the various parts are indicated by numerals, the shelter 11 comprises in general a substantially arch-shaped enclosure 13 mounted on top of suitable spaced-apart base portions. In the preferred embodiment the base portions 15 respectively on opposite sides of the shelter 11 are supported above the ground level 17 by a suitable frame structure 19 that includes upstanding and laterally spaced studs 21 mounted on base portions 23 which in turn are attached as by bolt assemblies 25 to a suitable foundation as the footings 27. If desired, frame structure 19 may be omitted and enclosure 13 may be mounted on base portions 23 so that the enclosure serves as the complete shelter including the sides. In the preferred embodiment, however, enclosure 13 serves as the top of the building and the sides in addition to frame structure 19 are completed by attaching an outer sheet 29 of transparent plastic material to the frame structure and the base portions 15, 23 as by nails or the like, and an inner sheet 31 of transparent plastic material is attached to the inside of the frame structure and base portions 15, 23 as by nails or the like. Thus, between the outer and inner sheets 29, 31 there are enclosed spaces 33, which serve as insulation. The base portions 15, 23 are preferably, though not necessarily respectively formed of pairs of wooden members, one on top of another, such as pairs of 2 x 4's.

Enclosure 13 comprises in general a plurality of arch-shaped rib means 35, a flexible inner sheet 37 subjacent rib means 35, a flexible outer sheet 39 disposed over rib means 35, and a layer of netting 41 between flexible outer sheet 39 and rib means 35. Inner and outer sheets 37, 39 and netting 41 are preferably formed of transparent substantially thin plastic material with the inner sheet being preferably of approximately four mil thickness and the outer sheet being of approximately six mil thickness. Due to the unique construction of enclosure 13, it is possible to use such thin plastic sheets, which would otherwise require a very thick plastic to even approach the strength provided by the present invention. Netting 41 is preferably, though not necessarily, a woven or plaited plastic such as five-strand polyethylene material, that is well-known to those skilled in the art.

Rib means 35 are preferably parallel and spaced apart along the length of shelter 11. Each of the rib means 35 is arch-shaped and extends substantially from one of base portions 15 substantially to the other. Preferably, each of the rib means 35 comprises a sleeve 43 of flexible plastic and a piece or pieces 45 of expanded plastic such as beaded styrofoam or the like which are received in sleeve 43 and extend substantially the length thereof. The pieces 45 are preferably block-like in construction and fill most of the interior of the sleeves 43. The combined sleeve 43 and pieces 45 provide the rib means 35 which has the characteristics of being bendable, light, and yet somewhat rigid. Thus, the rib means 35 may be bent into an arch-shape and yet provide sufficient strength to establish with the other parts of the composite enclosure 13, a substantially strong structure. The rib means 35 also perform a back-up function of preventing the inner sheet 37 from splitting, as will be better understood in the description to follow later in this specification.

The ends of shelter 11 are closed off by suitable means as the enclosure portions 47, 49, and the following description of enclosure portion 49 will suffice for both. Preferably, the footings 27 are extended across the end as at 51 and frame structure 53 which is similar to frame structure 19 is provided on footing 51 with inner and outer sheets of plastic placed on the inner and outer sides of the frame structure 53 as heretofore described relative to frame structure 19. In addition, if desired, additional studs 55 may be provided above frame structure 53, or if desired, enclosure 13 may be extended vertically downward from the end one of ribs 35 to frame structure 53 with the inner and outer sheets 37, 39 being gathered at the opposite sides as at 57, 59. If desired, the rib means 35 and netting 41 may be omitted at the end enclosure portions 47, 49, with the inner and outer sheets 37, 39 being attached to the opposite sides of studs 55. On the other hand, the studs 55 may be omitted and rib means 35 left between the inner and outer sheets 37, 39 to hold the sheets apart. It will be understood that these rib means 35, if left in between the inner and outer sheets, would be somewhat shorter than the ribs across the top of the shelter and would not necessarily be arch-shaped. Entrance to shelter 11 may be provided by any suitable means, such as a door, not shown, in one of the enclosures 47, 49.

Means such as a blower 61 that is communicated with the interior of shelter 11 as by means of the pipe 63 is provided for introducing air under pressure into the interior of the shelter to cause the interior of the shelter to be slightly above atmospheric pressure and to force inner sheet 37 against rib means 35. By the same token, it will be understood that the rib means 35, which are backed up by the netting 41, hold inner sheet 37 downwardly and prevent it from splitting. It will be understood that a certain amount of air will seep through inner sheet 37 into the spaces 64 between the inner and outer sheets 37, 39, which would cause a balooning of the outer sheet. However, means are provided communicating the spaces 64 to the outside atmosphere so that the outer sheet 39 is deflated and rests upon netting 41 and is held in spaced relationship to the inner sheet 37 by the netting. This above-mentioned communicating means is preferably in the form of apertures 65 provided in outer sheet 39, and if desired, may additionally or alternately by in the form of spaces 67 between the ends of inner battens 69, which construction will be better understood in the description to follow later in the specification relative to the assembly of shelter 11.

In assembling shelter 11 for the purposes of description it is assumed that the lower part of the shelter, that is all of the structure except enclosure 13, is already assembled since it is done by an obvious method well-known to those skilled in the art. Enclosure 13 can be put on completely from the outside, that is without walking in the area surrounded by frame structure 19, which is where the growing crops are disposed when the structure is used as a greenhouse. This characteristic of being able to be assembled from the outside is particularly important with growing crops since the workman might otherwise damage the crops if he walked around on the inside to put the roof on. In prior devices the roofs were put on from the inside by means of nailing the plastic sheets in place which was a time-consuming job. Heretofore it was necessary to put the roof on early in the season while the crops were small since otherwise they would be damaged as above described. By having to put the roof on early in the season for protection against the coming winter season, it meant that the electrical bill to keep the blowers going was much higher than is now possible with the present invention. It is a simple and easy matter to put on the enclosure 13 of the present invention, and is done as follows: First, the inner sheet 37 is placed over the crop area and is attached adjacent the side edges thereof as by the inner battens 69 as by means of the nails 71. As heretofore described, the ends of the inner battens 69 are spaced apart to provide the spaces 67. The battens are placed over the side edges 73 of inner sheet 37 and the nails 71 driven through the battens and into the base portions 15. The blower 61 is then started and the inner sheet 37 inflated. Next, the rib means 35 which have previously been preferably attached to the netting 41 as by means of the cords 75, are thrown over the inner sheet 37. The side edges of the netting 41 is then anchored in place by slipping the edges of the netting over the ends of the nails 77 that have been previously spaced along the base portion 15. The outer sheet 39 is then thrown over the netting 41 and rib means 35 and the side edges thereof are anchored in place by means of the outer battens 79 as by means of the nails 81. It will be understood that the outer battens 79 are placed over the side edges of the outer sheet 39 adjacent the inner battens 69 and the nails 81 driven through the inner and outer battens to complete the enclosure 13. The end enclosure portions 47, 49 are next completed as heretofore described.

From the foregoing description it will be understood that a unique composite enclosure is provided, which is substantially entirely made of plastics, which is transparent, and which is light yet sturdy. Thus, a shelter is possible with the use of the present invention which is particularly adapted to be quickly erected with a minimum of cost and is particularly adapted for growing crops, swimming pools, and playgrounds for children in which a transparent top and/or sides is desirable.

Although the invention has been described in some detail by way of illustration and example for purposes of clarity or understanding, it is to be understood that it is not to be so limited since changes and modifications may be made therein which are within the full intended scope of this invention as hereinafter claimed.

I claim:

1. In a shelter having spaced apart base portions, a substantially arch-shaped enclosure having opposite side edges respectively adjacent said base portions and said enclosure extending upwardly from adjacent said base portions and therebetween to establish an enclosed space means attaching said enclosure to said base portions adjacent the opposite side edges of said enclosure, said enclosure including a plurality of bendable arch-shaped rib means extending substantially from one of said base portions substantially to the other base portion, an inner flexible, continuous and unapertured sheet subjacent said rib means, an outer flexible sheet over said rib means in spaced apart relationship to said inner sheet, means communicating the space between said outer and inner sheets to the outside atmosphere whereby said outer sheet is deflated to allow said outer sheet to be supported by said rib means, and means communicating with the interior of said shelter for introducing air under pressure therein to cause the interior of said shelter to be above atmospheric pressure and to force said inner sheet against said rib means.

2. The shelter of claim 1 in which is included frame structure supporting said base portions and inner and outer spaced apart sheets of material respectively attached to said frame structure adjacent the inner and outer portions thereof to provide sides for such shelter.

3. The shelter of claim 1 in which said rib means comprises flexible plastic sleeves and pieces of expanded plastic received in said sleeves.

4. The shelter of claim 3 in which said inner and outer sheets are formed of a thin transparent plastic.

5. The shelter of claim 3 in which is provided means communicating the space between said outer and inner sheets to the outside atmosphere.

6. The shelter of claim 5 in which is included a layer of netting means interposed between said outer sheet and said rib means for holding said outer sheet in spaced apart relationship to said inner sheet.

7. A shelter comprising spaced apart base portions, a substantially arch-shaped transparent enclosure having opposite side edges respectively adjacent said base portions and said enclosure extending upwardly from adjacent said base portions and therebetween to establish an enclosed space, means attaching said enclosure to said base portions adjacent the opposite side edges of said enclosure, means adjacent the ends of said shelter closing off the ends thereof, said enclosure including a plurality of arch-shaped rib means extending from substantially one of said base portions substantially to the other base portion, each of said rib means including a flexible plastic sleeve and expanded plastic material received in said sleeve, an inner thin transparent plastic sheet subjacent said rib means, a layer of plastic netting on top of said rib means, an outer thin transparent plastic sheet on top of said netting in spaced apart relationship to said inner sheet, means communicating with the interior of said shelter for introducing air under pressure therein to cause the interior of said shelter to be above atmospheric pressure and to force said inner sheet against said rib means whereby said rib means in turn backed up by said netting hold said inner sheet, means communicating the space between said outer and inner sheets to the outside atmosphere to allow said outer sheet to rest on said netting in spaced relationship to said inner sheet.

References Cited

UNITED STATES PATENTS

| | | | |
|---|---|---|---|
| 2,753,818 | 7/1956 | Green | 52—2 |
| 2,837,101 | 6/1958 | Bary | 52—2 |
| 3,304,664 | 2/1967 | Duguette | 52—2 |

REINALDO P. MACHADO, *Primary Examiner.*